United States Patent Office 3,597,499
Patented Aug. 3, 1971

3,597,499
PRODUCTION OF MOLDING MATERIAL BASED ON POLYPROPYLENE AND HAVING IMPROVED IMPACT STRENGTH AT LOW TEMPERATURES
Guenther Daumiller, Ziegelhausen, Herbert Naarmann and Karl Wisseroth, Ludwigshafen (Rhine), Ernst-Guenther Kastning, deceased, late of Assenheim, Pfalz, Germany, by Marie-Louise Hermine Kastning, heiress-at-law and representative of minor heirs, Assenheim, Pfalz, Germany, assignors to Badische Anilin- & Soda-Fabrik Aktiengesellschaft, Ludwigshafen (Rhine), Germany
No Drawing. Filed Aug. 30, 1968, Ser. No. 758,184
Claims priority, application Germany, Sept. 5, 1967,
P 16 69 721.5
Int. Cl. C08f 47/12, 29/12
U.S. Cl. 260—876    2 Claims

ABSTRACT OF THE DISCLOSURE

A process for the production of polypropylene-based molding materials having improved impact strength at low temperatures. In this process a polypropylene having a relatively high fraction soluble in heptane is kneaded at elevated temperature with relatively small amounts of an elastomeric polymer containing polymerized units of a 1,3-diene with the addition of free radical-forming catalysts.

It is generally known that the toughness of polyolefines such as polyethylene and polypropylene can be improved by adding elastomeric polymers such as polyisobutylene, butyl rubber and elastomeric homopolymers and copolymers of 1,3-dienes such as particularly butadiene. The proportion of elastomeric polymers in such molding materials is in general about 5 to 30%, particularly about 10 to 20%, by weight. As a starting material for the prior art molding material based on polypropylene, a polypropylene is generally used which has a fraction of the polymer which is insoluble in boiling heptane of less than about 10%.

The prior art molding materials based on polypropylene and elastomeric polymers such as polyisobutylene or 1,3-diene polymers, for example polypropylene molding materials which according to U.K. Patent No. 957,368 contain about 15 to 25% by weight or according to U.K. Patent No. 999,827 about 3 to 15% by weight of 1,4-cispolybutadiene, exhibit an improved impact strength and notched impact strength at temperatures below 0° C. This improvement in the mechanical behavior of molding materials at low temperature declines, however, if the molding materials are kept for long periods at low temperatures. Thus for example the value for the notched impact strength of molding materials based on polypropylene and containing polybutadienes declines to about half the value it had at the beginning of storage after having been kept for five days at −20° C.; moreover, the molding materials lose their mechanical strength, for example plates made from the molding materials after having been stored for five days at −20° C. easily break.

We have now found that molding materials having improved impact resistance at low temperatures based on polypropylene can be prepared with advantage by kneading mixtures of polypropylene and 5 to 20% by weight (with reference to the mixture) of an elastomeric polymer containing at least 10% of its weight of a 1,3-diene in polymerized form with or without other additives at elevated temperature, by using a polypropylene having a fraction of 10 to 40% which is soluble in heptane and kneading it, with the addition of a catalyst forming free radicals, at a temperature of 110° to 250° C., the residence time in the kneading zone being from thirty seconds to twenty minutes.

Examples of elastomeric polymers having a content of polymerized units of 1,3-diene of at least 10% by weight are homopolymers of butadiene, 1-ethoxybutadiene and 2-ethoxybutadiene having K values of from 20 to 135 and a content of 1,2-vinyl groups of from 2 to 80%, also polyisoprenes, partciularly those having at least 20% of 1,4-bonds, and statistical copolymers of 1,3-dienes of the said type with vinylaromatic compounds such as particularly styrene or acrylic compounds such as particularly acrylonitrile, acrylic esters and methacrylic esters, for example methyl acrylate, ethyl acrylate, n-butyl acrylate, hexyl acrylate, propyl methacrylate, n-butyl methacrylate and octyl methacrylate, and also vinyl methyl ketone and isopropenyl methyl ketone. Block copolymers containing polymerized units of at least 10% of their weight of 1,3-dienes such as particularly butadiene and which have for example the following block sequence: styrene/butadiene or styrene/butadiene/styrene or butadiene/n-butyl acrylate are suitable. The K value of such block copolymers is generally from 10 to 130.

Graft polymers of polybutadiene and polyethylenes or polyisobutylenes in which the proportion of grafted polybutadiene is at least 10% by weight are also suitable as elastomeric polymers. These graft copolymers may be prepared for example by kneading, for example in a screw extruder, butadiene polymers, such as particularly homopolymers of butadiene, with polyethylenes and/or polyisobutylene in the presence of catalysts which form free radicals such as particularly ditertiary-butyl peroxide. It is preferable to use temperatures of from 160° to 210° C. and to use the free radical-forming catalysts generally in amounts of from 0.1 to 0.5% by weight with reference to the polydienes. Graft polymers of polybutadienes and polyethylenes having low density are of particular interest as graft polymers of the said type. Examples are polymers of 15 parts of polybutadiene having a K value 105 and which has a fraction of 35%, having 1,4-cis structure and a content of 9% of 1,2-vinyl, and 85 parts of polyethylene having K value of 100.5; of 20 parts of polybutadiene having a K value of 97 which has a fraction of 96% having 1,4-cis structure and a 1,2-vinyl fraction of 1%, and 80 parts of a polyisobutylene having a K value of 150; of 13.5 parts of polybutadiene having a K value of 32 which has a 1,2-vinyl fraction of 90%, and 86.5 parts of polyisobutylene having a K value of 130; of 21 parts of polybutadiene having a K value of 92 which has a fraction of 90% having 1,4-cis structure and a 1,2-vinyl fraction of 5%, and 79 parts of polyethylene having a K value of 120.

Copolymers of ethylene, vinyl acetate and butadiene whose content of polymerized ethylene units is from 40 to 60% by weight, whose content of polymerized vinyl acetate units is from 40 to 30% by weight and whose butadiene fraction is from 20 to 10% by weight and which have a K value of more than 80 are also suitable as elastomeric polymers. The elastomeric polymers which contain at least 10% by weight of polymerized units of 1,3-dienes which are suitable for the new process generally exhibit elastomeric properties at room temperature.

The polypropylene used as starting material for the molding material is one which has a fraction soluble in heptane of 10 to 40% by weight, i.e. a polypropylene of which 10 to 40% by weight can be extracted by heptane at the boiling temperature of heptane. The intrinsic viscosity [η] of suitable polypropylene is generally from 1 to 12. These polypropylenes are obtained for example when propylene is polymerized in the absence of organic solvents using organometallic catalysts such as are generally known as Ziegler catalysts. They generally have ash contents of less than 50 p.p.m.

Peroxides such as cumene hydroperoxide, di-tertiary-butyl peroxide, benzoyl peroxide and lauroyl peroxide are particularly suitable as free radical-forming catalysts for the process of the invention. Phthalide peroxides, such as 3 - phenyl - 3 - tertiary-butylperoxyphthalide, 3-p-tolyl-3-tertiary - butyl - peroxyphthalide and 3-p-chlorophenyl-3-tertiary-butylperoxyphthalide, are preferred. They are used in the process preferably in amounts of from 0.01 to 5% by weight with reference to the mixture of polypropylene and the elastomeric polymer.

The elastomeric polymer and the polypropylene are kneaded at temperatures of 110° to 250° C. in the new process in the presence of a radical-forming catalyst, the residence time in the kneading zone being from thirty seconds to twenty minutes, preferably one minute to ten minutes. The radical-forming catalyst may for example be added to the mixture of polypropylene and the elastomeric polymer in a premixing zone or directly in the kneading zone. Screw extruders, particularly those having more than one screw, are especially suitable for kneading the reaction mixture. The process may be carried out continuously in this type of mixer. It is also possible to carry out the process batchwise in conventional kneaders, for example blade kneaders.

Conventional additives for molding material based on polypropylene and which do not react with the radical-forming catalysts or the elastomeric polymers under the process conditions, for example ultraviolet stabilizers, pigments and fillers such as carbon black, and also iron powder may be used in the new process. These additives may be added to the starting materials or to the finished molding material, preferably in the kneading machines.

In accordance with the process of the invention, molding material based on polypropylene is obtained which behaves particularly favorably at low temperatures. At temperatures below 0° C. the molding material exhibits particularly high impact strengths and notched impact strengths, has a lesser tendency to fracture at low temperatures and undergoes practically no loss of these advantageous properties after prolonged storage at low temperatures. The product of the process are therefore particularly suitable for the production of moldings which are to be used at low temperatures, for example in cold storage installations and refrigerators.

The invention is illustrated by the following examples. The parts specified are by weight. K values therein are determined according to H. Finkentscher, Zellulosechemie 13 (1932) page 18, 0.1% solutions in decahydronaphthalene being used for polyolefines and graft polyolefines, and 0.5% solutions in toluene being used for the polydienes, the temperature measurement is 120° C. in each case.

EXAMPLE 1

90 parts of polypropylene which has a fraction of 30% which is soluble in boiling heptane is mixed with 10 parts of polybutadiene having a K value of 91 which has a fraction of 45% having 1,4-cis structure and a fraction of 14% having 1,4-vinyl structure, and 0.01 part of di-tertiary-butyl peroxide. The mixture is supplied to a commercial twin shaft screw extruder and kneaded therein at 140° C. The residence time in the kneading zone is five minutes. The molding material extruded from the extruder (it does not contain any extractable fraction of polybutadiene) is prepared for processing in the usual way. It has a notched impact strength at 0° C. of 0.21 m. kg., an impact strength of 48 cm./kg./m.² at −30° C. Its impact strength declines to 41 cm./kg./m.² after having been kept for five days at −30° C.

EXAMPLES 2 TO 8

In each case, 90 parts of polypropylene having an intrinsic viscosity $[\eta]=8$ and containing a fraction soluble in heptane of 20% by weight is mixed at room temperature with the amounts of 1,3-diene polymer and radical-forming catalyst specified in the following Table 1. The mixture in each case is fed into a twin shaft screw extruder and kneaded therein. The temperature of the kneading zone in ° C. (KT) and the residence time in minutes of the reaction mixture in the kneading zone (RT) are given in Table 1. The molding material is discharged in the usual way from the screw extruder and its notched impact strength and impact strength are determined. The results of the measurement in m. kg. of the notched impact strength at 0° C. (NO), at −10° C. (N–10) and at −20° C. (N–20) are given in Table 1 and the measurement of the impact strength in cm./kg./m.² at −30° C. (IS) in Table 2. Other abbreviations used in the tables are: E= Example No.; 1,3-diene=1,3-diene polymer with the amount in parts given in brackets; 5DS=notched impact strength in m. kg. at −20° C. after five days' storage; IS5=impact strength in cm./kg./m.² after storage for five days at −30° C.;

A=polybutadiene, K value 104, 1,4-cis content 36%, 1,4-trans content 57%, 1,2-vinyl content 7%;

B=block copolymer, K value 92, from 85% of butadiene and 15% of styrene, having a 1,2-vinyl content of 10%;

C=graft copolymer of 20 parts of polybutadiene having a 1,4-cis content of 50%, a 1,2-vinyl content of 10% and 80 parts of polyethylene having a K value of 109.5 and a density of 0.918;

D=graft copolymer of 25 parts of polybutadiene having a 1,4-cis content of 48% a 1,2-vinyl content of 11% and 75 part of polyisobutylene, K value 102;

E=graft copolymer, K value 120, from 36 parts of polybutadiene having a 1,4-cis content of 11% and a 1,2-vinyl content of 25% and 64 parts of polyisobutylene having a K value of 135;

F=graft copolymer, K value 125, from 18 parts of polybutadiene having a 1,4-cis content of 96% and a 1,2-vinyl content of 3% and 82 parts of polyethylene, density 0.918, K value 121.5;

G=mixture of equal parts of polybutadiene, K value 101.5, 1,4-cis content 93% and polybutadiene, K value 24 and 1,2-vinyl content 78%;

H=benzoyl peroxide; L=cumene hydroperoxide; M=tertiary-butyl hydroperoxide; N=diisopropylbenzene diperoxide;

TABLE 1

| E | 1,3-diene | Catalyst | KT | RT | NO | N-10 | N-20 | 5DS |
|---|---|---|---|---|---|---|---|---|
| 2 | A (18) | H (0.1) | 130 | 5 | 0.20 | 0.18 | 0.16 | 0.15 |
| 3 | B (14) | I (0.2) | 180 | 15 | 0.22 | 0.19 | 0.17 | 0.17 |
| 4 | C (20) | J (0.5) | 145 | 3 | 0.21 | 0.20 | 0.18 | 0.16 |
| 5 | D (12) | K (0.01) L (0.3) | 120 | 30 | 0.19 | 0.18 | 0.17 | 0.17 |
| 6 | E (10) | M (0.8) | 170 | 10 | 0.23 | 0.21 | 0.18 | 0.18 |
| 7 | F (8) | N (1.5) | 200 | 5 | 0.20 | 0.21 | 0.17 | 0.16 |
| 8 | G (6) | J (3) | 230 | 60 | 0.21 | 0.20 | 0.19 | 0.17 |

TABLE 2

| E | IS | IS5 |
|---|---|---|
| 2 | 49 | 43 |
| 3 | 42 | 40 |
| 4 | 51 | 47 |
| 5 | 40 | 39 |
| 6 | 42 | 38 |
| 7 | 50 | 48 |
| 8 | 41 | 37 |

When the procedure of Example 2 is followed but an equal amount of peroxy-3-phenyl-3-tertiary-phenylperoxyphthalide is used as a catalyst, a molding material is obtained under conditions which are, otherwise the same which has an impact strength at −30° C. of 78 cm./kg./cm.² which after storage for five days at −30° C., is 67 cm./kg./cm.².

Comparative experiments (a) 90 parts of polypropylene having the properties specified in Examples 2 to 8 is mixed with 0.5 part of ditertiary-butyl peroxide and the mixture is fed into the twin shaft screw extruder used in Examples 2 to 8. The temperature in the kneading zone is 140° C. and the residence time in the kneading zone is ten minutes. The product obtained has a notched impact strength of 0.05 m. kg. at 0° C. (The notched impact strength of the polypropylene used as starting product is 0.04 m. kg. at 0° C.)

(b) 90 parts of polypropylene having the properties given in Examples 2 to 8 is mixed with 18 parts of polybutadiene of the type described in Example 2 and the mixture is fed to the screw extruder used for Examples 2 to 8. The kneading temperature is 130° C. and the residence time in the kneading zone is three minutes. A molding material is obtained having a notched impact strength of 0.19 m. kg. (0° C.), 0.17 m. kg. (−10° C.) and 0.13 m. kg. (−20° C.). The notched impact strength of the material declines to 0.06 m. kg. after it has been stored for five days at −20° C.

We claim:
1. A process for the production of molding material having improved impact strength at low temperatures and based on polypropylene by kneading mixtures of (a) polypropylene, (b) 5 to 20% by weight with reference to the mixture of polypropylene and the elastic polymer of an elastomeric polymer containing at least 10% of its weight of polymerised units of a 1,3-diene and (c) 0.1 to 0.5% by weight with reference to the mixture of polypropylene and the elastic polymer of an organic peroxide radical-forming catalyst, at a temperature of from 110° to 250° C., and a residence time in the kneading zone of from thirty seconds to twenty minutes, wherein (I) the polypropylene used has a fraction soluble in heptane of from 10 to 40% by weight and (II) the organic peroxide radical-forming catalyst used is a phthalide peroxide.

2. A process as in claim 1 wherein the phthalide peroxide is selected from the group consisting of 3-phenyl-3-tertiary-butyl-peroxyphthalide, 3 - p-tolyl-3-tertiary-butyl-peroxyphthalide and 3-p-chlorophenyl-3-tertiary-butylperoxyphthalide.

References Cited

UNITED STATES PATENTS

| 2,877,206 | 3/1959 | Scott | 260—889 |
| 3,294,868 | 12/1966 | Pritchard | 260—876 |
| 3,407,253 | 10/1968 | Yoshimura et al. | 260—889 |

FOREIGN PATENTS

| 837,525 | 6/1960 | Great Britain | 260—4 |
| 999,827 | 7/1965 | Great Britain | 260—889 |

SAMUEL H. BLECH, Primary Examiner

U.S. Cl. X.R.

260—41.5, 889